United States Patent
Höglander et al.

(10) Patent No.: US 7,542,780 B2
(45) Date of Patent: Jun. 2, 2009

(54) METHOD, APPARATUS AND ARRANGEMENT IN A TELECOMMUNICATIONS NETWORK FOR PROVIDING CONTROL OVER AND ENABLING ADVANCED SERVICES AND USER INTERFACES IN A MOBILE TELEPHONE

(75) Inventors: Mats Höglander, Tyresö (SE); Leif Isaksson, Tyresö (SE); Kjell Roxnäs, Vargön (SE)

(73) Assignee: Telefonaktiebolaget L M Ericsson (PUBL), Stockholm (SE)

( * ) Notice: Subject to any disclaimer, the term of this patent is extended or adjusted under 35 U.S.C. 154(b) by 0 days.

(21) Appl. No.: 10/495,734

(22) PCT Filed: Nov. 20, 2001

(86) PCT No.: PCT/SE01/02568

§ 371 (c)(1),
(2), (4) Date: Sep. 17, 2004

(87) PCT Pub. No.: WO03/045102

PCT Pub. Date: May 30, 2003

(65) Prior Publication Data

US 2005/0048967 A1    Mar. 3, 2005

(51) Int. Cl.
*H04M 1/00* (2006.01)
(52) U.S. Cl. ............... 455/555; 455/554.1; 455/426.2; 455/445
(58) Field of Classification Search ........ 455/554.1–555, 455/445, 462–465, 426.1, 433, 416; 379/137, 379/220.01, 265.01–266.1, 309; 370/328
See application file for complete search history.

(56) References Cited

U.S. PATENT DOCUMENTS

| | | | | |
|---|---|---|---|---|
| 4,125,748 | A | * | 11/1978 | Nahabedian et al. ........ 379/158 |
| 5,036,535 | A | * | 7/1991 | Gechter et al. ......... 379/265.11 |
| 5,400,327 | A | * | 3/1995 | Dezonno ..................... 370/271 |
| 5,550,905 | A | | 8/1996 | Silverman |
| 5,841,854 | A | * | 11/1998 | Schumacher et al. ... 379/265.11 |
| 5,956,652 | A | * | 9/1999 | Eriksson ..................... 455/555 |
| 5,966,437 | A | * | 10/1999 | Cox et al. .................... 379/309 |
| 5,983,096 | A | * | 11/1999 | Lietha et al. ................ 455/416 |
| 6,167,257 | A | * | 12/2000 | Lahdemaki .................. 455/419 |
| 6,178,183 | B1 | | 1/2001 | Buskirk, Jr. |
| 6,256,512 | B1 | * | 7/2001 | Verdonk ................... 455/554.1 |
| 6,400,708 | B1 | * | 6/2002 | Bartholomew et al. ...... 370/352 |
| 6,430,395 | B2 | * | 8/2002 | Arazi et al. ................. 455/41.2 |
| 6,516,061 | B2 | * | 2/2003 | Horowitz et al. ............ 379/233 |

(Continued)

FOREIGN PATENT DOCUMENTS

| | | |
|---|---|---|
| GB | 2334403 | 8/1999 |
| GB | 2334403 A * | 8/1999 |
| WO | WO0119093 A1 * | 3/2001 |

*Primary Examiner*—Sharad Rampuria

(57) ABSTRACT

A PBX (10) is connected to a mobile telephony network (40) via a PSTN (20) and via a LAN (90) and data network (30). A mobile telephone (50) served by the mobile network, has a separate data channel (100). The invention describes a way to integrate mobile telephones as extensions of the PBX and to provide them with functionality similar to that of a wired digital PBX system telephone (70). The data channel of the mobile telephone is used to give the PBX access to the user interface devices of the telephone. The speech path between the PBX and the mobile telephone may be set up in the direction from the PBX to the mobile telephone, even when the call was initiated at the telephone. The invention relies only on the basic voice and data communications services of the mobile telephony network, and therefore provides independence from the network operator.

31 Claims, 8 Drawing Sheets

U.S. PATENT DOCUMENTS

| | | | |
|---|---|---|---|
| 6,535,730 B1 * | 3/2003 | Chow et al. | 455/416 |
| 6,542,475 B1 * | 4/2003 | Bala et al. | 370/271 |
| 6,640,108 B2 * | 10/2003 | Lu et al. | 455/463 |
| 6,671,366 B1 * | 12/2003 | Isotalo | 379/221.08 |
| 6,687,360 B2 * | 2/2004 | Kung et al. | 379/211.02 |
| 6,839,421 B2 * | 1/2005 | Ferraro Esparza et al. | 379/220.01 |
| 6,983,145 B1 * | 1/2006 | Uskela | 455/426.2 |
| 6,993,360 B2 * | 1/2006 | Plahte et al. | 455/555 |
| 2002/0132638 A1 * | 9/2002 | Plahte et al. | 455/555 |
| 2003/0125023 A1 * | 7/2003 | Fishler | 455/426 |

\* cited by examiner

METHOD, APPARATUS AND ARRANGEMENT IN A TELECOMMUNICATIONS NETWORK FOR PROVIDING CONTROL OVER AND ENABLING ADVANCED SERVICES AND USER INTERFACES IN A MOBILE TELEPHONE

TECHNICAL FIELD OF THE INVENTION

The present invention relates to apparatuses, methods and arrangements in a telecommunications network, including a mobile telephony network, for providing control over and enabling advanced services and user interfaces in a mobile telephone.

DESCRIPTION OF RELATED ART

The telephony services provided today by a mobile telephony network to mobile telephones are, apart from the mobility itself, typically similar to those provided by the PSTN to fixed extensions. A private branch exchange (PBX) typically relates to mobile telephones in much the same way as it relates to fixed extensions in the PSTN.

EP0865219 (Björk) teaches a base station subsystem that via a mobility server is connected to a PBX and to a public network. With Björk's solution, the advanced telephony services of the PBX cannot be provided to mobile telephones located outside of the coverage of the base station subsystem, which is typically the PBX owner's premises. Björk's solution requires very close cooperation with a network operator.

WO 0119093 (Wallenius) teaches using WAP for call control in an intelligent network. Wallenius' solution is intended to be a part of the network, or is at least dependent on very close cooperation with the network operator.

WO0065862 (Fils) teaches using a separate communications path to handle signalling for call redirection. Fils solution is intended to be a part of the network, or is at at least dependent on very close cooperation with the network operator.

SUMMARY OF THE INVENTION

A PBX (Private branch exchange) provides advanced telephony services and user interfaces to its users, and gives good control of call handling and of telephony costs.

Telephony users are becoming more mobile, often using mobile telephones to work at home or on the move. However, as the mobile telephones are not extensions of a PBX, the advantages of the PBX are lost. The present invention is concerned with the problem of integrating mobile telephones as extensions of a PBX.

A first problem in achieving integration is that the mobile telephone is not registered as an extension in the PBX.

A second problem is that the PBX does not have access to the user interface devices of the mobile telephone, and therefore cannot provide the advanced user interface of the PBX to the user of the mobile telephone.

Another problem is that the PBX does not control the setup of speech channel from the mobile telephone to the PBX A related problem is that the PBX needs signalling access to the mobile telephone, so that call-related signalling can be exchanged freely between the PBX and the mobile telephone.

A problem with signalling access is that network operator policies may limit the way that available signalling schemes in the mobile telephony network and public telephone network signalling channels may be used by other parties such as PBX:s.

Another problem with signalling access is that signalling through the mobile telephony network and public telephone network signalling channels does not provide all the functionality needed for advanced telephony services and user interfaces. It is unlikely that network operators would be willing to implement additions to their signalling services to satisfy the owner of a PBX who wants to have mobile telephones as extensions.

A further problem is that outgoing calls from the mobile telephone are routed and handled according to the choice of the mobile network operator. The owner of a PBX may want the outgoing calls from the mobile telephone to be connected via the PBX, so that a choice can be made of which operators to use, or otherwise to have better control over call handling. This would require an agreement with the operator that outgoing calls from the mobile telephone always be routed to the PBX, since the routing of outgoing calls is controlled by the operator.

Another problem is that text-based directory lookup services for mobile telephones using standard browsers cannot easily be integrated with call setup. When the sought number is found, the user must manually enter the number on the keypad of the mobile telephone.

The problems are solved by the following:

In order to integrate the mobile telephone as an extension of the PBX, it is registered as an extension in the PBX.

Further, the PBX is given control of the user interface devices of the mobile telephone by the PBX communicating (exchanging messages, signalling) with software in the mobile telephone.

To give the PBX free signalling access to the mobile telephone, a separate data channel is used instead of the normal channel for call-related signalling.

To give the PBX control over speech channel setup, and to give better control over call handling and costs, all calls through the mobile telephony network (including those initiated at the mobile telephone) are set up in the direction from the PBX to the mobile telephone.

To save a mobile user of a text-based directory lookup service from having to enter a found number manually on the mobile telephone keypad, a "Call" alternative is provided in the lookup service. When the alternative is selected, the PBX sets up the call.

More closely, the abovementioned problems are solved as follows.

The mobile telephone is assigned an extension identity in the PBX. Since the PBX is independent from the mobile telephony network, the identity need not correspond in any way to the identity of the mobile telephone in the mobile telephony network, but can, for example, be a number much shorter than ordinary mobile telephone numbers, as is typical for PBX extension numbers.

The extension identity is stored in the PBX along with other extension data as needed to provide advanced telephony services and user interfaces and give control of call handling and costs.

The mobile telephone is provided with software with which the PBX can communicate to control the user interface devices and calling functions of the mobile telephone.

The mobile telephone has, in addition to the normal speech and signalling channels used for calls, a separate data channel for communication via a data network. This channel is used for the exchange of messages (signalling) between the PBX and the software in the-mobile telephone, since the signalling on this channel is free from restrictions by operator policies and limited functionality.

The ordinary signalling channel is used only for basic signalling between the mobile telephone and the mobile telephony network.

All calls through the mobile telephony network are set up in the direction from the PBX to the mobile telephone. When the mobile telephone user wants to make a call, this is signalled to the PBX on the separate data channel, instead of to the mobile network on the ordinary signalling channel. The PBX then sets up a call from the PBX to the mobile telephone and another call from the PBX to the desired destination. The two calls are connected to each other.

In the text-based directory lookup service, when a number has been found, a "call" alternative is provided. When this alternative is selected, information that the selection has taken place is transferred over the separate data channel to the directory service, which forwards it to the PBX, and a call is set up in the direction from the PBX to the mobile telephone and from the PBX to the destination, as described above.

It is an object of the present invention to integrate mobile telephones as extensions in a PBX in a way that makes it possible to provide advanced telephony services and user interfaces and give good control of call handling and cost.

It is an object of the present invention to acheive the integration using only the basic telephony and data communication services of the mobile telephony network, and not require any special interfaces with the mobile network or special agreements with its operator, thereby gaining independence from the operator.

It is an object of the present invention to give the PBX control of the user interface devices and calling functions of the mobile telephone, so that the advanced user interface of a PBX extension can be provided to the user of the mobile telephone.

It is an object of the present invention to provide unrestricted signalling access between the PBX and the mobile telephone.

It is an object of the present invention to give the PBX owner better control of the setup, routing and other handling of calls from mobile telephones, independent of the operator of the mobile telephony network.

It is an object of the present invention to save the user from having to manually enter a number found in a text-based directory lookup service in order to set up a call to it.

An advantage of the present invention is thus that the PBX has unrestricted access to the mobile telephone for call-related signalling.

Another advantage is that the PBX can control the user interface devices and calling functions of the mobile telephone and provide an advanced user interface.

Another advantage of the present invention is that mobile telephones can be integrated as extensions in a PBX and provided with advanced telephony services and user interfaces and which will give good control of call handling and cost.

A further advantage is that said integration can be acheived using only the basic telephony and data communications services of the mobile telephony network, without relying on special interfaces or special agreements.

Still an advantage is that the PBX owner can better control the setup, routing and other handling of calls from mobile telephones, independent of the operator.

Another advantage is that telephony support applications such as directory lookup can be integrated with call setup.

BRIEF DESCRIPTION OF THE DRAWINGS

Embodiments of the invention will now be described in connection with figures, of which.

DETAILED DESCRIPTION OF EMBODIMENTS

Figure 1:
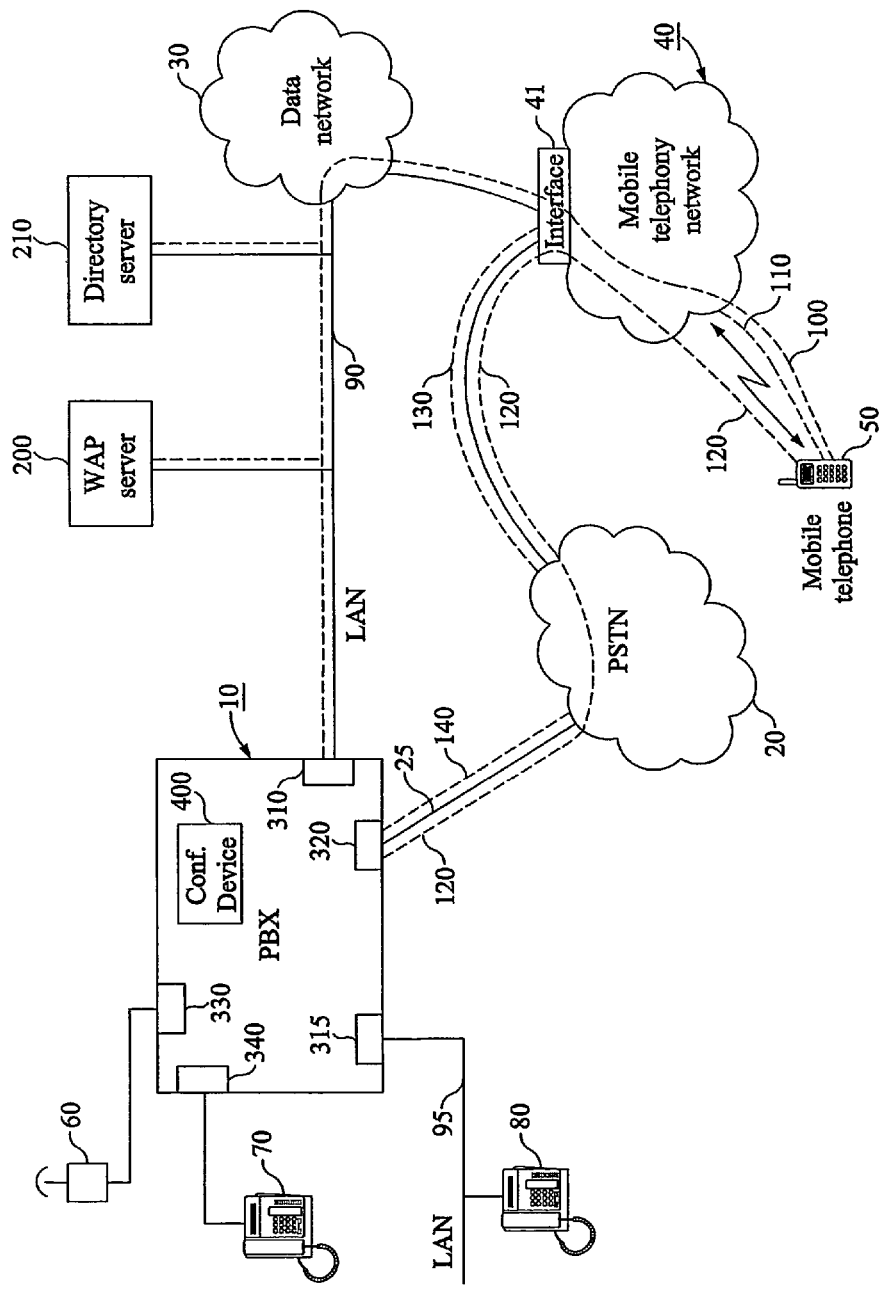
FIG. 1 shows a block schematic of a telecommunications network.

With reference to FIG. 1, the invention comprises a PBX 10, a public telephone network (PSTN) 20, a local area network (LAN)90, a data network 30, a mobile telephony network 40 and a mobile telephone 50.

The mobile telephony network 40 connects to other fixed networks such as the PSTN 20 and the data network 30 at an interface to fixed networks 41. Interface 41 may comprise multiple, distributed logical and physical interfaces.

The PBX 10 is typically a single entity, but may also be composed of a number of servers under common administration that share a common set of extension identities and collaborate to handle calls to and from these extensions (not shown).

The PBX 10 is connected to the PSTN 20 via a trunk interface 320. The interface 320 is a public network trunk access interface, for example the ISDN T reference point.

The PBX 10 may have ordinary wired extensions, analog 60 or digital 70, connected through line interfaces 330 and 340. It can also have IP extensions 80 connected over a LAN or other IP data network 95. The networks 90 and 95 are connected to the PBX via data network interfaces 310 and 315. In an alternative, a single network is used.

The PBX has one or more conference devices 400, which are used to connect several extensions in a conference call.

The digital extensions 70 and IP extensions 80 are normally equipped with a display and a keyboard with more keys than a conventional analog telephone 60.

The PBX normally presents menus of service alternatives on the display of the digital extension 70 or IP extension 80. The menu alternatives are adapted to be relevant to the current calling status (state), e.g. if a called extension is busy, the caller's menu includes the call back service. A change state of the extension or of a call on it may thus lead to a change of menu. Also calling line identification information is displayed, as well as call progress information. The extensions may have many buttons in addition to the usual 0-9, # and *. These buttons may function to invoke services. The function of some buttons may be changed according to the current call status to provide relevant services, and the current meaning of a button may be displayed on the display. This presents an advanced and user friendly user interface.

The PBX 10 can set up normal telephone calls to the mobile telephone 50 via the trunk 25, the PSTN 20 and the mobile telephony network 40. This is governed by signalling between the PBX and the PSTN on the signalling channel 140, by signalling between the PSTN and the mobile telephony network on the signalling channel 130, and by signalling between the mobile telephony network and the mobile telephone on the signalling channel 110. A speech channel 120 is set up from the PBX to the mobile telephone when the call is connected.

Figure 2:
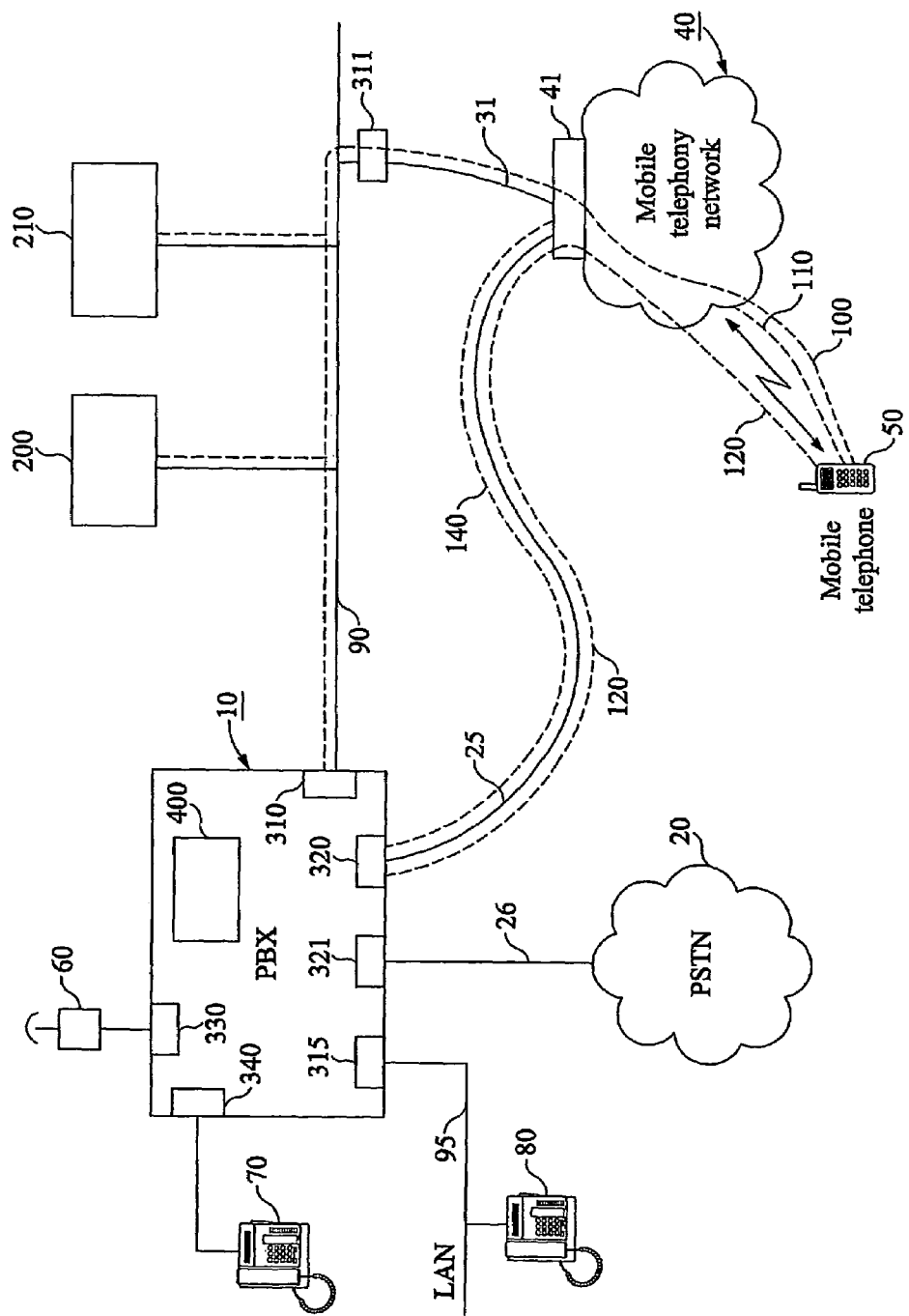
FIG. 2 shows a block schematic of an alternative telecommunications network.

In an alternative, the PBX has a dedicated connection to the mobile telephony network instead of the PSTN. However, the PSTN may be needed anyway for other communication between the PBX and destinations in the PSTN, and is then connected with another trunk interface 321 and another trunk 26, as shown in FIG. 2.

In another alternative, the PBX 10 can set up calls to the mobile telephone 50 via a trunk connection to another telephone exchange that is connected to the PSTN 20 (not shown).

The functionalities of the signalling channels 140 in the PSTN and 110 to the mobile telephone are controlled by the operators of the PSTN 20 and the mobile telephony network 40 respectively, and normally do not provide the functionality needed for advanced telephony services and user interfaces. The signalling path through signalling channel 110, mobile telephony network 40, signalling channel 130, PSTN 20 and signalling channel 140 can not be used to give the PBX 10 control of the user interface devices of mobile telephone 50.

The mobile telephone 50 has a display and a keyboard. It also has the capability to emit alerting sounds, e.g. to sound a ring signal.

The mobile telephone 50 may be a conventional mobile telephone, or it may be some other device comprising mobile telephone functionality, for example a PDA (Personal Digital Assistant) with mobile telephone functionality.

The mobile telephone 50 and the mobile telephony network 40 support a data communication service, such as GPRS or the data communication service of UMTS. Thus the mobile telephone 50 has a separate data channel 100 for data communication with a data network 30.

The data network 30 and the LAN 90 connect the PBX 10 to the data communications service of the mobile telephony network 40. The LAN is connected at a data communications interface 310 of the PBX. The PBX and the mobile telephone can exchange messages via the data channel 100, the data network 30 and the LAN 90. This signalling path does not have the limitations of the signalling path 110-40-130-20-140 through the PSTN, described above. Instead, messages are delivered end-to-end regardless of content. Thus, the PBX 10 can use this path to control of the user interface devices of the mobile telephone 50.

In an alternative, the PBX via an interface 311 has a dedicated data connection 31 to the mobile telephony network, instead of the data network 30 as shown in FIG. 2.

In another alternative, the PBX does not exchange messages directly with the mobile telephone, but via an intervening server 200, that may be a WAP server. The server may handle communication protocols, add formatting and user interface details to messages or otherwise convert the format of exchanged messages. The server may adapt the communication to suit a browser in the mobile telephone 50.

The server may communicate with a CSTA (Computer Supported Telephony Applications) interface of the PBX 10. The CSTA interface may be a software entity, reached through the LAN interface 310. Alternatively, the CSTA interface may be provided by a CSTA server (not shown) that communicates with the PBX.

In a further alternative, a text-based directory lookup service is provided by a server 210. The server is connected to the LAN 90 and thereby has connectivity to the PBX 10 and the data network 30. In an alternative, the server 210 has dedicated connections (not shown) to the data network 30 and the PBX 10. The server 210 may communicate with the PBX 10 through the CSTA interface (not shown) of the PBX.

The directory lookup service communicates with the mobile telephone either directly or through the server 200 that may be a WAP server. The service lets a user of the mobile telephone 50 find data about other users of the PBX, such as their extension numbers and mail addresses.

In order to integrate the mobile telephone 50 as an extension in the PBX 10, the mobile telephone is assigned an extension identity in the PBX. This is often a number of from 2 to 5 digits. There need not be any correspondence between the extension number, and the telephone number or other identity of the mobile telephone in the mobile telephony network.

The PBX 10 also stores data about the extension. The stored data comprises information about the number of the mobile telephone in the mobile telephony network and information on where to adress messages for the mobile telephone that are to be sent on the data channel. It also comprises information about the rights of the extension user to make use of PBX resources, such as whether she is allowed to make international calls, and information about user settings and preferences, such as diversion options, etc. The information about rights, settings and preferences is selectable independent from the operators of the mobile telephony network 40 and the PSTN 20. The PBX 10 also keeps information about the current status of the extension, such as if it is busy or idle.

The mobile telephone 50 is equipped with software that allows the PBX 10 to present information on the screen of the mobile telephone by sending messages (signals) to it over the data channel 100. The software also allows the user of the mobile telephone 50 to provide input to the keyboard or other input device of the mobile telephone, whereby the PBX 10 is informed of the user input through a message sent from the mobile telephone 50 to the PBX 10 over the data channel 100.

The software may also allow the PBX 10 to cause the mobile telephone 50 to emit a sound, for example to signal an incoming call, and it may allow the PBX 10 to cause the mobile telephone 50 to send an answer message to the mobile telephony network on the ordinary signalling channel 110, or even provide the PBX with complete control of the ordinary calling functions of the mobile telephone. Alternatively, the mobile telephone 50 may be configured to answer incoming calls automatically.

The software in the mobile telephone may be specially written for the present invention, or it may consist of a WAP browser that communicates with the PBX via a WAP server, or some other suitable browser, or it may be a combination of a standard browser and specially made enhancements and adaptions.

When the PBX 10 has the ability to communicate with the user interface devices of the mobile telephone 50, the setup of speech path between the PBX and the mobile telephone can be controlled by the PBX, since all calls can be setup in the direction from the PBX to the mobile telephone, or the PBX may cause the mobile telephone to set up a call to the PBX.

In the way described above, by using the data channel 100 for unrestricted communication between the PBX and the, mobile telephone, by giving the PBX 10 control over the display and other output from the mobile telephone 50, by providing to the PBX information about user input on the mobile telephone 50, and by the PBX 10 being able to control the setup of a speech channel between the PBX and the mobile telephone, the services of the PBX 10 can be provided to the mobile telephone 50 with the same functionality as for a wired PBX digital system telephone 70.

Specifically, the PBX can display menues of service alternatives to the user of mobile telephone 50, and the menues can be changed in the course of making calls or otherwise using the phone, so that the menu always presents services or alternatives that are especially relevant to what the user currently is doing, e.g. present a "call back" alternative when the user has made a call and encountered busy, or a "conference" alternative when the user has a party parked and makes an inquiry to a third party.

The same set of services that is available to a wired digital system telephone 70 will be available to the mobile telephone 50. This includes services such as conference call, park/inquiry, operator camp-on, diversion and follow-me, as well as administrative functions of the PBX, such as logging of calls, setting of restrictions on outgoing calls on a per-user basis, etc. A list of some typical PBX services is provided in appendix A.

Apart from the basic subscription for telephony and data communications service, which is part of the mobile operator's normal service offering, there is no need for a special agreement with the mobile operator. There is also no need for special interfaces to the mobile network apart from those which are normally used to access the basic services. This provides independence from the operator, which is a particular advantage in situations where mobile operators are unwilling, or even hostile to attempts by other parties to provide advanced services to mobile telephones.

A modern PBX typically provides over 500 different telephony services. Specific examples will be given below for a few of those services.

Incoming Call

Figure 3:
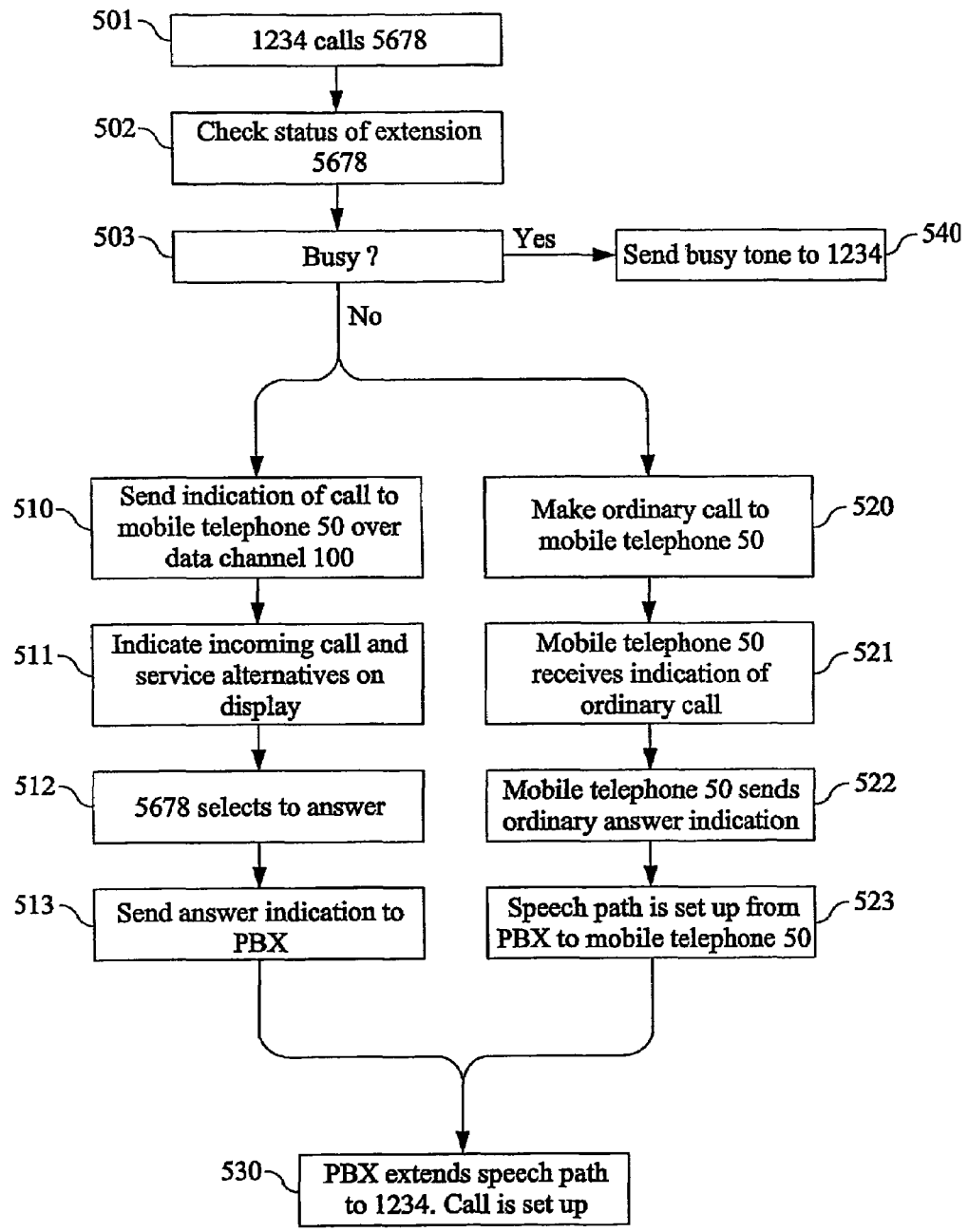
FIG. 3 shows a flow diagram of setting up of an incoming call to a mobile telephone.

With reference to FIG. 3, an incoming call to the mobile telephone 50 is handled as follows.

Extension 1234 is a wired digital PBX system telephone 70, belonging to user Jim Smith. The mobile telephone 50 belongs to user John Doe and has extension number 5678.

In a step 501, Jim Smith dials 5678 to call John Doe. In a step 502, the PBX checks the status of extension 5678. If it is busy, alternative "Yes" in a step 503, Jim Smith receives busy tone in the conventional way, step 540.

If extension 5678 is not busy, the PBX 10 proceeds with call setup. Two sequences of events, namely steps 510 through 513 and steps 520 through 523 now occur in parallel.

In the step 520, the PBX initiates, by signalling on the ordinary signalling channel 140, an ordinary external call through the PSTN 20 and the mobile network 40 to the mobile telephone 50.

In a step 521, the mobile telephone receives an indication of the incoming call in the ordinary way over signalling channel 110.

In a step 522, the mobile telephone automatically sends an answer indication to the mobile telephony network on the ordinary signalling channel 110, as soon as it has received the indication of the incoming call from the mobile telephony network (autoanswer).

When the mobile telephony network 40 receives the answer indication over the ordinary signalling channel 110, a speech path is set up from the PBX 10 to the mobile telephone 50 in the ordinary way, step 523.

At the same time as the ordinary call is initiated, the PBX 10 sends to the mobile telephone 50 over the data channel 100 a first message indicating the incoming call from Jim Smith, step 510.

The first message may include the extension number and name of the calling party (1234 Jim Smith), to be displayed on the display of mobile telephone 50, as well as relevant service alternatives.

This is a particular advantage over a traditional call from a PBX extension over the PSTN and mobile telephony network to a mobile extension. Often only the external number of the PBX switchboard is shown as calling line identification (CLI) if an extension calls a mobile telephone, or if an external party calls into an extension that is diverted to a mobile telephone. That is not very informative.

When the first message indicating the incoming call has been received over the data channel 100, the number and name of the calling party (1234 Jim Smith) is displayed on the mobile telephone along with service alternatives such as "answer", "reject", "divert to voicemail", etc, step 511.

When the user John Doe of the mobile telephone 50 selects "answer", step 512, the PBX 10 is informed of this fact through communication over the data channel 100, step 513.

When steps 513 and 523 have been completed, the PBX 10 extends the established speech connection with mobile telephone 50 to the telephone 70 of extension 1234, and the call between Jim Smith and John Doe has thus been set up, step 530.

In an alternative, instead of the mobile telephone 50 automatically sending an answer indication over the ordinary signalling channel 110, the PBX 10 may send a second message on the data channel 100 causing the mobile telephone to send an answer indication to the mobile telephony network on the ordinary signalling channel 110. The PBX may wait until it has received information that John Doe has selected to answer the call before it sends the message over the data channel 100 that causes the mobile telephone 50 to send the answer indication on the signalling channel 110, or it may be sent as soon as the PBX receives an "alerting" indication on the signalling channel 140.

In another alternative, the ordinary call through the PSTN may be initiated only after user John Doe of the mobile telephone 50 has selected to answer the call from Jim Smith, that is, step 520 is carried out after step 513 has been completed and the PBX has received information that John Doe has selected to answer.

In a further alternative, John Doe may have to press the normal answer button of the mobile telephone 50 to send the answer indication to the mobile telephony network over the ordinary signalling channel 110. In yet an alternative, the mobile telephone 50 sends the answer indication over the channel 110 when John Doe selects the "Answer" alternative in response to the incoming call from John Smith.

In still an alternative, the ordinary call through the PSTN is set up before any indication of the incoming call is sent over the data channel 100, that is, step 510 is not carried out until step 523 has been completed.

Outgoing Call

Figure 4:
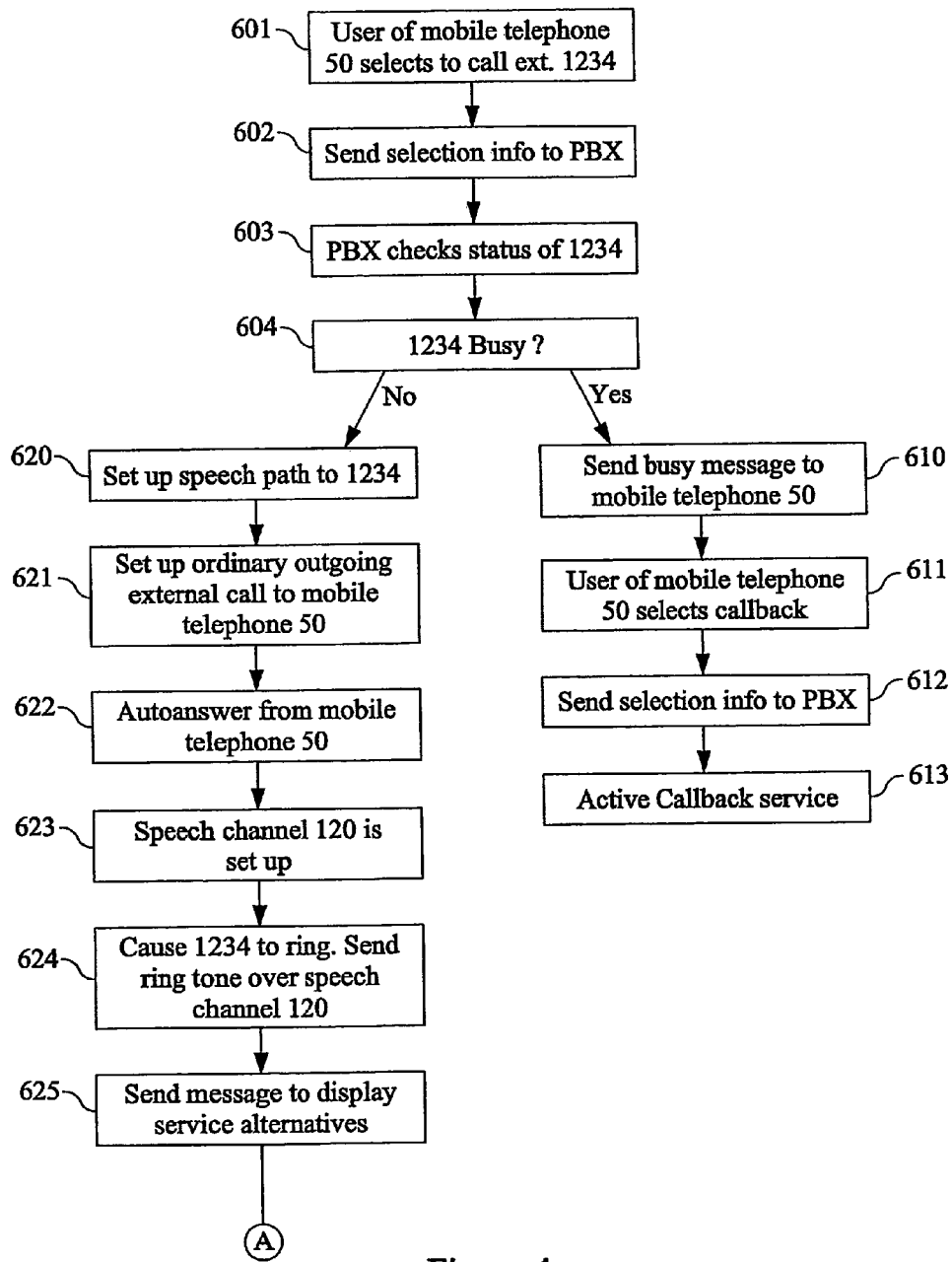
FIG. 4 shows a flow diagram of setting up of an outgoing call from a mobile telephone.
Figure 4:
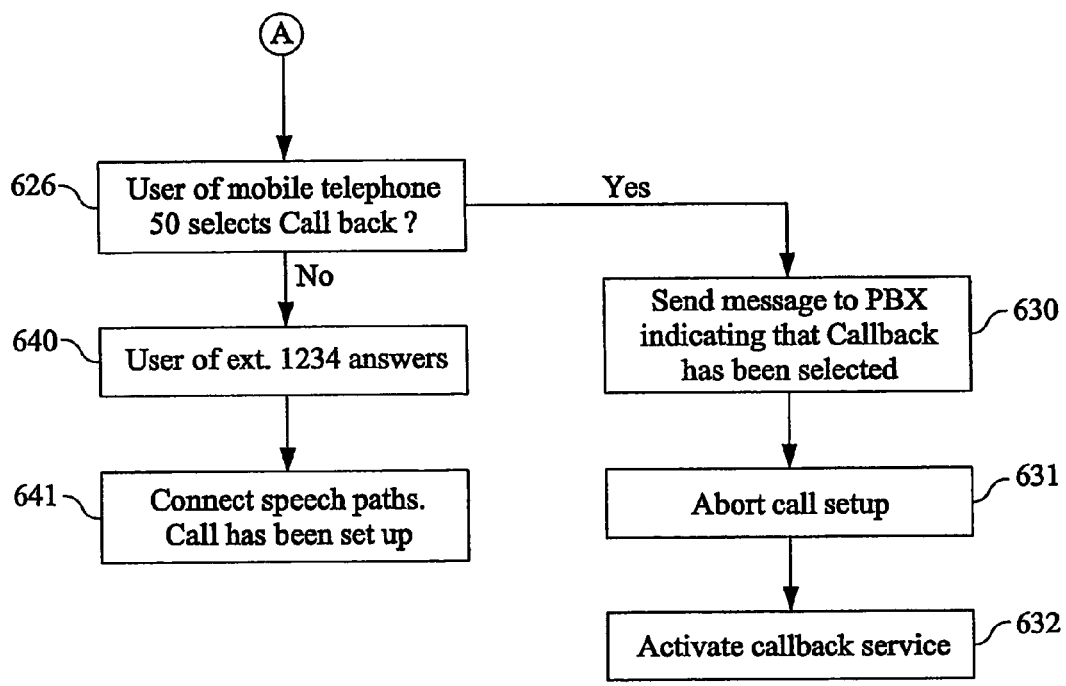

John Doe decides to call Jim Smith. As before, John Doe is the user of mobile telephone 50 which has extension number 5678, and Jim Smith is the user of wired telephone 70 which has extension number 1234. With reference to FIG. 4, the following events take place.

In a step 601, John enters the number 1234 on the mobile telephone keypad, and selects "Call". This may be by pressing a specific button, or by selecting an alternative presented on the screen.

The mobile telephone 50 sends to the PBX 10 over the data channel 100 the information that the user has selected to call the number 1234, step 602. Alternatively, the PBX is separately informed of each button pressed on the mobile telephone, and from this information concludes that the user has selected to call extension 1234.

The PBX receives the information that the user of mobile telephone 50 wants to call extension 1234 and proceeds to check the status of extension 1234, step 603.

If the extension 1234 is busy, alternative "Yes" in a step 604, no speech paths are set up, instead the PBX sends a message back to the mobile telephone over the data channel 100 causing it display information about this fact, along with relevant service alternatives such as "Call Back", "Connect to Voicemail" or "Connect to operator", step 610.

If John selects call back, step 611, this is communicated to the PBX 10 over the data channel 100, step 612, and the PBX activates the callback service, step 613.

If extension 1234 is not busy, alternative "No" in the step 604, the PBX 10 proceeds to set up a speech path to extension 1234 in the normal way, step 620, and also sets up an ordinary outgoing external call from the PBX to mobile telephone 50, step 621. The mobile telephone 50 answers the call automatically, step 622, or else the PBX causes it to answer by sending it a message. Alternatively, the user may have to press an answer button on the mobile telephone. A speech channel 120 between the PBX and the mobile telephone is established, step 623.

The PBX 10 causes extension 1234 to ring, and ringing tone is sent to mobile telephone 50 over the established speech channel 120, step 624.

While the call is being set up, the PBX may present service alternatives on the display of the mobile telephone, such as "Call Back", step 625. If Jim Smith does not answer and John Doe selects "Call Back", alternative "Yes" in a step 626, the PBX 10 is informed of the selection through a message over the data channel 100, step 630, call setup is aborted, step 631, and the callback service is activated, step 632.

If instead extension 1234 answers, step 640, the speech paths are connected, to form a speech connection between mobile telephone 50 and extension 1234, and the call from John Doe to Jim Smith has thus been set up, step 641.

In an alternative, the speech connection 120 is set up in the direction from the mobile telephone 50 to the PBX, instead of the other way around. The PBX may send a message to the mobile telephone over the data channel 100, causing it to initiate a call from the mobile telephone through the mobile telephony network to the PBX, Except for the reversed direction of setting up the speech channel 120, the call is handled as described above.

In a further alternative, the software in the mobile telephone 50 detects that the user wants to make a call and sets up a call to the PBX without the PBX having to send a message for that purpose.

Outgoing Call to External Destination

An external destination is one which is not an extension of the PBX 10. It is typically reached through the PSTN 20.

An outgoing call from the mobile telephone 50 to an external destination is handled similar to the call described above to extension 1234. When the destination is external, the PBX 10 checks the rights of John Doe at extension 5678 to make an external call, and if he is not allowed to call the desired destination, the call is rejected and no speech paths are set up. If the call is allowed, a first ordinary, outgoing external call is set up to mobile telephone 50 as described above, and a second ordinary outgoing external call is set up to the desired destination, instead of the call setup towards extension 1234. When the desired destination answers, the speech path of the second ordinary outgoing call is connected to the speech path of the first ordinary outgoing external call from PBX 10 to mobile telephone 50, to form a speech path from the mobile telephone to the desired destination.

A particular advantage when setting up ordinary outgoing external calls from the PBX is that the PBX can control which operator to use for the call. When an ordinary call is set up from mobile telephone 50 through mobile telephony network 40, it is the operator of network 40 that decides which operator to use for the further connection of the call outside of the mobile network 40.

"Call" Alternative in Directory Service.

When the user of the mobile telephone 50 is making use of a text-based directory lookup service, provided by the server 210 and accessed via the data channel 100, it is inconvenient to enter a found destination number on the keyboard of the mobile telephone. Therefore, the menu of the directory service is provided with a "call" alternative. When the call alternative is selected, the directory service signals this to the PBX. The PBX then sets up the call as described above. Specifically, the speech path between the PBX and the mobile telephone may be setup by way of an ordinary outgoing call from the PBX to the mobile telephone.

In an alternative, the directory service uses the PBX CSTA interface to set up a call between the mobile telephone and the desired destination.

In another alternative the communication between directory server 210 and mobile telephone 50 takes place via a server that may be the server 200. The server 200 may be a WAP server. The server may handle communication protocols, add formatting and user interface details to messages or otherwise convert the format of exchanged messages. This may be done to suit a browser in the mobile telephone 50.

In a further alternative, the information that the user of mobile telephone 50 has selected to call the found number is sent directly to the PBX 10.

Figure 7:
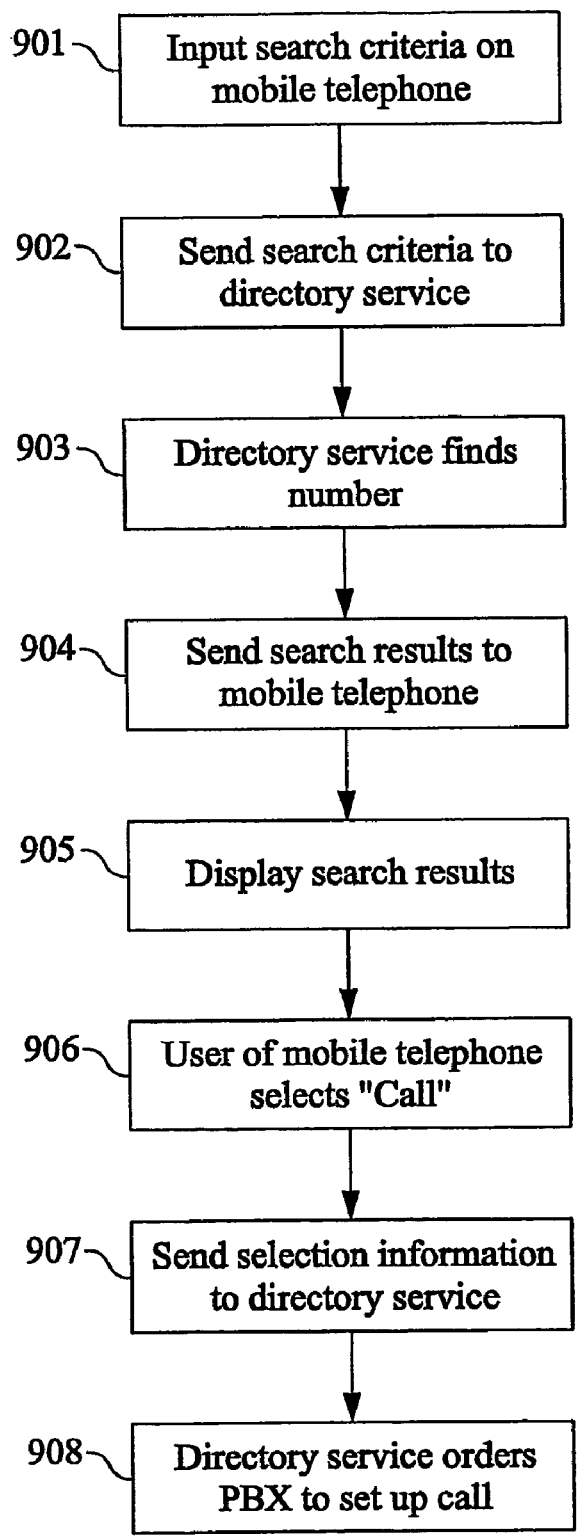
FIG. 7 shows a flow diagram of a mobile telephone setting up a call to a number found through a directory search.

With reference to FIG. 7, a search and call may take place as follows.

In a step 901, the user of the mobile telephone 60 inputs search criteria to find a user in the directory service. In a step 902, the criteria are sent to the directory service over the data channel 100. The directory service finds the number of the sought user, step 903 and sends the search results back to the mobile telephone over the data channel 100, step 904. The mobile telephone displays the results, step 905, along with service alternatives such as "Call". In a step 906, the user of the mobile telephone selects the "Call" alternative, and in a step 907, the directory service is informed of the selection through a message over the data channel 100. In a step 908, the directory service orders the PBX to set up a call between the mobile telephone 50 and the number that was found in the directory search.

Outgoing Call from Browsing Call Log

PBX extensions are often equipped with a log of missed calls. According to the present invention, the log can be accessed from the mobile telephone 50 via communication with the PBX 10 over the data channel 100 and missed calls can be displayed on the mobile telephone display.

Similar to the directory lookup service, a "Call" alternative is provided, so that the user of the mobile telephone 50 can select a missed call and then select to call the party that the missed call was from. The information that the user has selected to call the party that originated the missed call is then transferred to the PBX over the data channel 100 and a call is set up as described above. Specifically, the speech path between the PBX and the mobile telephone may be set up by way of an ordinary outgoing call from the PBX to the mobile telephone.

Inquiry and Conference

During an ongoing call, the PBX may present service alternatives on the display of the mobile telephone 50 by sending information to the mobile telephone over the data channel 100.

One of these service alternatives may be the well-known "inquiry" service. When the user of the mobile telephone selects to make an inquiry to another extension or external number, this is communicated to the PBX 10 over the data channel 100. The PBX puts the line with which the mobile telephone is currently connected on hold and sets up a new call to the destination of the inquiry.

When the call to the inquired party has been answered, the service alternatives displayed on the mobile telephone may include Conference call. If the alternative is selected, the selection is again communicated to the PBX over data channel 100, and the call from the PBX to the mobile telephone, the call to the inquired party and the call to extension 1234 are all connected to ports on the conference device 400, so that they may all speak to each other together.

Hanging Up from the Mobile Telephone.

Figure 5:
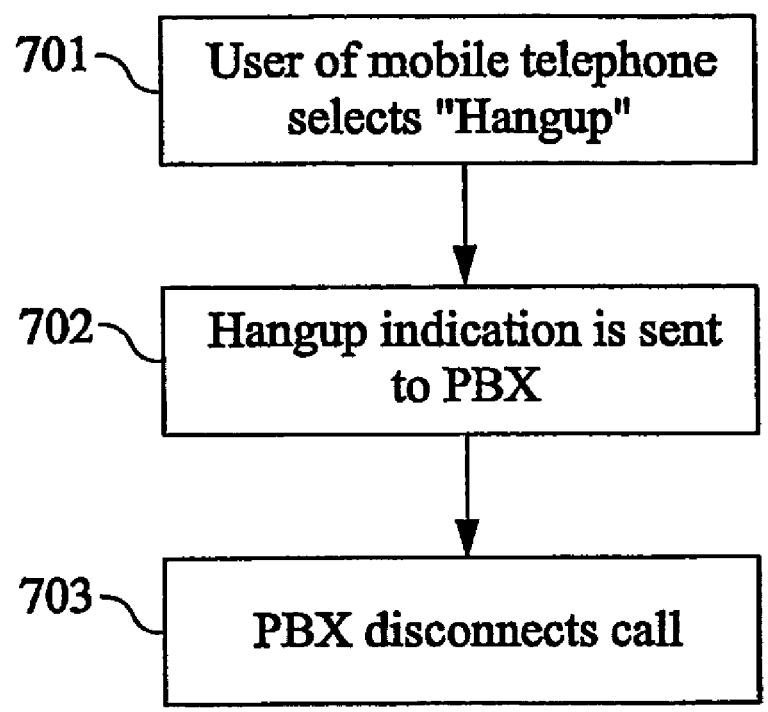
FIG. 5 shows a flow diagram of a mobile telephone ending a call.

With reference to FIG. 5, when the user of the mobile telephone 50 selects to end the call, step 701, this is signalled to the PBX 10 over the data channel 100, step 702, and the PBX then disconnects the call, step 703.

Figure 6:
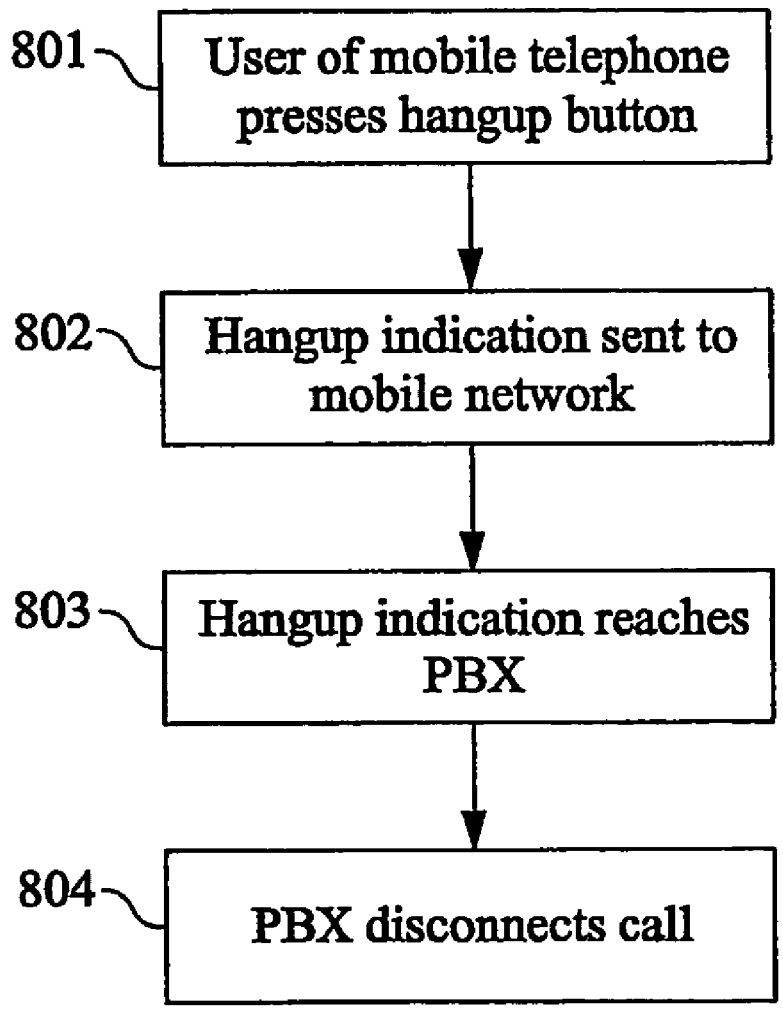
FIG. 6 shows a flow diagram of an alternative way of a mobile telephone ending a call.

In an alternative, with reference to FIG. 6, the user of mobile telephone 50 presses a hangup button, step 801, that activates the ordinary hangup function of the mobile telephone, and the mobile telephone signals to the mobile telephony network 40 over the ordinary signalling channel 110 that the call is to be disconnected, step 802. The PBX receives information of the disconnection on the ordinary signalling channel 140, step 803, and subsequently disconnects any remaining speech paths and other resources belonging to the call, step 804.

After the call has been disconnected, the PBX through communication on the data channel 100, may cause the mobile telephone 50 to display alternatives relevant to the current idle state of the telephone, such as "Call" and "Divert".

Message Waiting. "Listen" Alternative

When someone leaves a voice message or other message in the PBX for extension 5678, which is the mobile telephone 50, the PBX sends a message to the mobile telephone over the data channel 100 to cause it to display a message waiting indication. If the message is a voice message, a "listen" alternative is provided. When the user selects the "listen" alternative, this is communicated to the PBX via the data channel 100, and a call to the voice mail facility of the PBX is set up so that the user can listen to the message.

By communication over the data channel 100, the voice mail facility may cause alternatives for browsing, listening to and managing messages to be displayed on the mobile telephone, to provide a convenient user interface.

In an alternative, the selection to listen to a message is communicated to the voice mail facility, and the voice mail facility then orders the PBX to set up a call between the mobile telephone and the voice mail facility. The speech path between the PBX and the mobile telephone is set up similar to what is described above under "outgoing call", for example by way of an ordinary outgoing call from the PBX to the mobile telephone.

Setting Preferences

There are a number of preferences and other settings associated with a typical modern PBX extension. For example, diversion, personal number profile and security lock.

These settings are conveniently accessed through the mobile telephone interface, through communication over the data channel 100.

Initialization

It is necessary for the PBX 10 to have information about what data network adress to use to send messages intended to reach the mobile telephone 50 over the data channel 100.

This information can be sent to the PBX 10 by the mobile telephone when it is turned on. To do this, the mobile telephone has stored an address of the PBX 10 to use when sending messages to it.

Alternatively, the mobile telephone can set up a session with the server 200, that may be a WAP server. The server informs the PBX 10 of the session identity and the PBX can then cause messages to be sent to the mobile telephone by interacting with the server session.

The mobile telephone might retrieve the address of the PBX from another server. The address of that server must then be stored in the mobile telephone.

If the mobile telephony network provides a service whereby the data network address of the mobile telephone can be provided if the telephone number of the mobile telephone is known, that service can be used by the PBX 10.

If the mobile telephony network provides fixed data network addresses for mobile telephones, the fixed address of the mobile telephone may be stored permanently in the PBX.

Mobile Telephone Software

It may be desirable to use standard software in the mobile telephone 50, since otherwise software may have to be specially developed for the purpose of the present invention.

However, standard browsers may not have all the needed functionality. For example, it may not be possible for the PBX to cause the mobile telephone to emit a sound, or to control the calling functions of the mobile telephone. The display of the mobile telephone may be overwritten by the telephone standard software in the course of a call, so that the PBX cannot reliably use it to present alternatives tailored to the particular call states. Information that is delivered to the browser using WAP push functionality may not be presented directly on the display as desired.

The limitations may be overcome by enhancing or adapting existing browsers to provide the needed functionality. A compromise can also be made, sacrificing some functionality. For example, the normal ring signal function of the mobile telephone may be used instead of a PBX-controlled one, and the user may have to use the normal answer button on the telephone, instead of the PBX causing the mobile telephone to send an answer indication to the mobile telephony network, or the telephone answering automatically. In that case, the phone would ring on both incoming and outgoing calls, and the user would have to press the normal answer button for the call to be connected. Likewise, the normal button for hanging up a call could be used, instead of PBX-controlled hangup.

If software is specially made, it may be designed to inform the PBX of each button pressed or other input from the user, so that the PBX may use this information to draw conclusions about user selections. The display of the mobile telephone may be updated by the PBX each time it receives information that a button has been pressed, for example when scrolling a list. This provides flexibility, in that the interface presented to the user may be changed by changing software in the PBX, but leads to increased communication over the data channel and possibly to slower response to user input.

Alternatively, the handling of menus and selections may take place in the software of the mobile telephone, so that the PBX need only send information to the telephone when a new menu is to be presented, and the telephone need not inform the PBX of every button pressed, but only when a selection has been made.

Mobile Telephones with Limited Data Channel

In some mobile telephones, the data channel 100 cannot be used simultaneously with the speech channel 120, for example in certain classes of GPRS telephones. An incoming ordinary call may cause the data channel to become unavailable.

If the mobile telephone 50 has such a limitation, it may be necessary to set up the speech channel as late as possible when setting up a call.

For example, in the setup of an incoming call as described in FIG. 3, the sequence of steps 510 through 513 should be carried out before the sequence of steps 520 through 523. Alternatively, the call could be answered in the ordinary way by use of the answer button and an answer indication sent to the mobile network over the signalling channel 110, and only information about the caller being sent from the PBX 10 over the data channel 100.

Some mobile telephone software would overwrite the caller information displayed by the PBX with caller information supplied by the mobile network 40 when the indication of the incoming call reaches the mobile telephone over signalling channel 110. Such software needs to be adapted, or else the caller information supplied from the PBX will only be displayed for a short time.

When the speech channel 120 has been set up, interaction with the PBX via the data channel 100 is not possible. During this time, in-band DTMF signalling may be used to activate PBX services, for example pressing "5" to activate call-back towards an extension that does not answer, or pressing "3" to form a conference call from an onging call and a parked party.

All-IP Solution

To acheive complete independence from the call setup services of the mobile telephony network 40, the data channel 100 may also be used to transfer speech. The mobile telephone 50 would be, equipped with the same functionality as a wired IP extension 80 of the PBX, but instead of the wired IP connection, the data channel 100 is used for IP connectivity. In this way, the call setup functions of the mobile telephony network 40 need not be used at all. All calling communication, control signalling as well as speech, is handled solely on the data channel 100.

Appendix A

List of some typical PBX services provided by the Ericsson MD110 PBX.
Direct indialling
Inquiry and refer back
Transfer
Call waiting
Conference
Call back on busy
Call back on free on no reply
Executive intrusion
Last external number redial
Diversion by pass
Abbreviated dialling common numbers
Abbreviated dialling individual numbers
Group call pick up
Common bell group
Individual call pick up
Group hunting
Paging
Message waiting
Diversion
Follow Me
General Cancellation
Individual call charging
Night service
Emergency category
Emergency extension
Hot line
Delayed Hot line
Automatic answer category
Authorization code
Regional Authorization code
Day and night categories for TCD
Individual do not disturb
Account code
Emergency call to operator
Manual message waiting
Malicious Call Tracing
External follow me
Group Do Not Disturb
Repeated Individual Diversion
Personal Number
Called/Calling/Connected number display
Presentation restriction
Name display
Secretarial Supervision
Saved number redial
Message waiting
Dial by Name
Name and Number log
Operator Call announcement
Serial call
Operator Camp-on
Operator Intrusion
Operator Supervision
PABX operator supervised call charging
Operator Identification of party connected to busy extension
Night service
Paging
Call charging, individual and group
Call information logging
Music-on-hold
Recorded Announcement
Private Network Routing
Least Cost Routing
On-hook queuing
Expensive Route Warning Tone
DISA
Toll Restrictions

The invention claimed is:

1. A telephone exchange in a telecommunications network, the telephone exchange comprising:
   means for registering a mobile telephone and assigning a unique extension identifier to the mobile telephone, wherein the mobile telephone is adapted for communication with the telephone exchange via a data channel and a voice channel through a mobile telephony network;

communication means for sending call setup signaling messages to the mobile telephone and receiving call setup signaling messages from the mobile telephone over the data channel;

means for controlling interfaces associated with the mobile telephone using basic telephony and data communication services of the mobile telephony network exclusive of special mobile operator agreements or special interfaces with the mobile telephony network;

means for receiving over the data channel, an indication that the mobile telephone is initiating a call to a called number; and means for performing reverse direction call setup in response to the indication that the mobile telephone is initiating the call to the called number, said means for performing reverse direction call setup including:

means for setting up a speech path from the telephone exchange to the called number;

means for initiating an outgoing external call in a direction from the telephone exchange to the mobile telephone;

means for detecting that the mobile telephone has answered the outgoing external call; and means for connecting the speech path and the outgoing external call to form a speech connection between the mobile telephone and the called number.

2. The telephone exchange of claim 1, wherein:

a dedicated, direct speech connection is set up between the telephone exchange and the mobile telephony network via a public network trunk access interface; and a speech channel is set up from the telephone exchange to the mobile device when a call is connected to the mobile telephone.

3. The telephone exchange according to claim 1, further comprising means for providing telephony services to the mobile telephone.

4. The telephone exchange according to claim 3, said means for providing telephony services further comprises providing the services without requiring an agreement with an operator of the mobile telephony network for that purpose.

5. The telephone exchange according to claim 1, wherein the telephone exchange stores information about the rights of users to use resources in the telephone exchange and information about user settings and preferences, said information being selectable independent from the operator of the mobile telephony network.

6. The telephone exchange according to claim 1, wherein the mobile telephone has an extension identity in the telephone exchange, said extension identity being different from the telephone number of said mobile telephone in the mobile telephony network.

7. The telephone exchange according to claim 1, wherein the telephone exchange further comprises means to present service alternatives on the display of the mobile telephone, said service alternatives being relevant to the current state of the extension representing the mobile telephone, or relevant to the current state of a call on the extension.

8. The telephone exchange according to claim 1, wherein the telephone exchange further comprises means for allowing the user of the mobile telephone to select services of the telephone exchange through in-band Dual-Tone Multi-Frequency (DTMF) signaling when the data channel is unavailable.

9. The telephone exchange according to claim 1, wherein the communication with the mobile telephone passes over the data channel via a server that changes the format of the communication to suit a browser in the mobile telephone.

10. The telephone exchange according to claim 9, wherein the server is a Wireless Application Protocol (WAP) server.

11. A method in a telecommunications network of setting up a call from a mobile telephone, said method comprising the steps of receiving at a telephone exchange, an indication that a user of the mobile telephone desires to place the call to a selected number, wherein the indication is received via a data channel from the mobile telephone;

performing reverse direction call setup in response to the mobile telephone initiating the call to the selected number, said step of performing reverse direction call setup including:

initiating an outgoing external call in a direction from the telephone exchange to the mobile telephone to establish a first speech path from the telephone exchange to the mobile telephone;

setting up a second speech path from the telephone exchange to the selected number; and connecting the first speech path and the second speech path to complete the call.

12. A method in a telecommunications network of selling up a call from a mobile telephone, said method comprising the steps of:

selecting a number to be called from a directory lookup service;

the mobile telephone signaling to a telephone exchange via a data channel of the mobile telephone, that a user of the mobile telephone desires to place the call;

transferring information associated with the selected number over the data channel of the mobile telephone;

performing reverse direction call setup by the telephone exchange in response to the mobile telephone signaling call initiation, said step of performing reverse direction call setup including:

initiating an outgoing external call in a direction from the telephone exchange to the mobile telephone to establish a first speech path from the telephone exchange to the mobile telephone;

setting up a second speech path from the telephone exchange to the selected number; and connecting the first speech path and the second speech path in the telephone exchange to complete the call.

13. A method in a telecommunications network of retrieving a voice message by a mobile telephone having a separate data channel, said method comprising the steps of:

sending from a telephone exchange to the mobile telephone over the separate data channel, information that a voice message is available;

receiving in the telephone exchange, an indication from the mobile telephone that a user of the mobile telephone wants to listen to the voice message, said indication being received over the separate data channel; and performing reverse direction call setup by initiating an outgoing external call in a direction from the telephone exchange to the mobile telephone to establish a first speech path from the telephone exchange to the mobile telephone in response to receiving the indication from the mobile telephone that the user of the mobile telephone wants to listen to the voice message.

14. A method in a telecommunications network of selling up a call from a mobile telephone to a number in a call log, the call log being stored in a telephone exchange, comprising the steps of:

sending to the mobile telephone, over a separate data channel of the mobile telephone, information about the number in the log;

receiving in the telephone exchange, an indication from the mobile telephone that the user of the mobile telephone has selected to call the number, said indication being received over the separate data channel; and performing reverse direction call setup by the telephone exchange in response to receiving the indication that the user of the mobile telephone has selected to call the number, said step of performing reverse direction call setup including:

initiating an outgoing external call in a direction from the telephone exchange to the mobile telephone to establish a first speech path from the telephone exchange to the mobile telephone;

setting up a second speech path from the telephone exchange to the number in the call log; and connecting the first speech path and the second speech path to form a speech connection between the mobile telephone and the number in the call log.

15. An arrangement in a telecommunications network comprising:

a telephone exchange, comprising:

means for registering a mobile telephone, wherein the mobile telephone is adapted for communication with the telephone exchange via a data channel and a voice channel;

means for receiving over the data channel, an indication that a user of the mobile telephone desires to place a call to a called number;

means for performing reverse direction call setup in response to the indication that the mobile telephone is initiating the call to the called number, said means for performing reverse direction call setup including:

means for setting up a speech path from the telephone exchange to the called number;

means for initiating an outgoing external call in a direction from the telephone exchange to the mobile telephone; and means for connecting the speech path and the outgoing external call to form a speech connection between the mobile telephone and the called number;

a mobile telephony network for providing a telephony service;

a network that connects the telephone exchange to the telephony service of the mobile telephony network; and a data network that connects the telephone exchange to the data channel of the mobile telephone through the mobile telephony network.

16. The arrangement according to claim 15, wherein the connection between the telephone exchange and the telephony service of the mobile network passes via a public network trunk access interface.

17. A method of integrating a mobile device, having mobile telephone functionality, as an extension of a telephone exchange, said method comprising the steps of:

registering a mobile telephone and assigning a unique extension identifier to the mobile phone, wherein the mobile telephone is adapted for communication with the telephone exchange via a data channel and a voice channel through a mobile telephony network;

receiving signaling from the mobile telephone via the data channel indicating a user of the mobile telephone desires to place a call; and performing reverse direction call setup by the telephone exchange in response to the signaling from the mobile telephone, said step of performing reverse direction call setup including:

initiating an outgoing external call in a direction from the telephone exchange to the mobile telephone in response to signaling from the mobile telephone initiating the outgoing call;

setting up a call from the telephone exchange to the desired destination and connecting the outgoing call to the call to the desired destination;

controlling interfaces associated with the mobile telephone using basic telephony and data communication services of the mobile telephony network exclusive of mobile operator agreements or special interfaces with the mobile telephony network; and setting up a speech channel utilizing signaling from the mobile telephone via the data channel.

18. The method of claim 17, further comprising providing telephony services to the mobile telephone.

19. The method of claim 17, wherein the step of communicating with the mobile telephone via the data channel further comprises delivering messages end to end regardless of content.

20. The method of claim 17, further comprising storing information about the rights of users to use resources in the telephone exchange and information about user settings and preferences, said information being selectable independent of the operator of the mobile telephony network.

21. The method of claim 17, wherein the mobile telephone is assigned an extension identity in the telephone exchange, the extension identity being different from the telephone number of said mobile telephone in the mobile telephony network.

22. The method of claim 17, further comprising the step of presenting service alternatives on the display of the mobile telephone, said service alternatives being relevant to the current state of the extension representing the mobile telephone, or relevant to the current state of a call on the extension.

23. The method of claim 17, further comprising the step of allowing the user of the mobile telephone to select telephony services from the telephone exchange through in-band Dual-Tone Multi-Frequency (DTMF) signaling when the data channel is unavailable.

24. The method of claim 17, further comprising the step of communicating with the mobile telephone via the data channel through a server that changes the format of the communication to suit a browser in the mobile telephone.

25. The method of claim 24, wherein the server is a Wireless Application Protocol (WAP) server.

26. The method of claim 12, wherein the directory look up service is provided by a directory server associated with the telephone exchange and the server is accessed through the data channel of the mobile telephone.

27. The method of claim 12, further comprising the step of the mobile telephone selecting a call alternative enabling the directory service to send a signal to the telephone exchange for setting the speech path from the telephone exchange to the mobile telephone.

28. The method of claim 12, wherein communication takes place between the directory server and a browser in the mobile telephone using a server adapted for:

handling communication protocols;

adding formatting and user interface details to messages; and converting the format of exchanged messages.

29. The method of claim 12, further comprising forming a dedicated, direct speech connection between the telephone exchange and the mobile telephony network via a public network trunk access interface and setting up a speech channel from the telephone exchange to the mobile telephone when a call is connected to the mobile telephone.

30. A call setup unit in a telecommunications network, the call setup unit comprising:

means for registering a mobile telephone, wherein the mobile telephone is adapted for communication with the call setup unit via a data channel and a voice channel through a mobile telephony network;

means for receiving over the data channel, an indication that the mobile telephone desires to initiate a call to a called number; and means for performing reverse direction call setup in response to the indication that the mobile telephone desires to initiate the call to the called number, said means for performing reverse direction call setup including:

means for setting up a speech path from the call setup unit to the called number;

means for initiating an outgoing external call in a direction from the call setup unit to the mobile telephone; and means for connecting the speech path and the outgoing external call to form a speech connection between the mobile telephone and the called number.

31. The telephone exchange of claim 1, wherein the communication means for sending call setup signaling messages to the mobile telephone and receiving call setup signaling messages from the mobile telephone over the data channel includes means for sending a message to the mobile telephone causing the mobile telephone to answer the outgoing external call from the exchange.

* * * * *

UNITED STATES PATENT AND TRADEMARK OFFICE
CERTIFICATE OF CORRECTION

PATENT NO. : 7,542,780 B2  Page 1 of 1
APPLICATION NO. : 10/495734
DATED : June 2, 2009
INVENTOR(S) : Hoglander et al.

It is certified that error appears in the above-identified patent and that said Letters Patent is hereby corrected as shown below:

In Column 16, Line 22, in Claim 12, delete "selling" and insert -- setting --, therefor.

In Column 16, Line 61, in Claim 14, delete "selling" and insert -- setting --, therefor.

In Column 17, Line 14, in Claim 14, delete "selling" and insert -- setting --, therefor.

In Column 17, Line 33, in Claim 15, delete "selling" and insert -- setting --, therefor.

Signed and Sealed this

Tenth Day of November, 2009

David J. Kappos
*Director of the United States Patent and Trademark Office*